Oct. 15, 1946.　　　A. BOUWERS　　　2,409,186
TELESCOPE SYSTEM
Filed Dec. 24, 1942
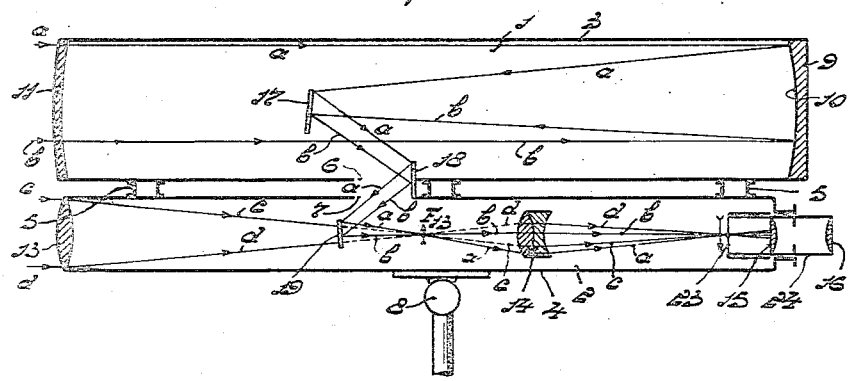
INVENTOR
Albert Bouwers
BY
E. F. Wendroth
ATTORNEY Patented Oct. 15, 1946

2,409,186

UNITED STATES PATENT OFFICE 2,409,186

TELESCOPE SYSTEM

Albert Bouwers, Eindhoven, Netherlands; vested in the Alien Property Custodian

Application December 24, 1942, Serial No. 470,090
In the Netherlands February 13, 1941

6 Claims. (Cl. 88—32)

A spyglass system consisting of a greatly amplifying spyglass and a finder is already known. Spyglasses of this type are first adjusted, with the aid of the finder, on an object to be viewed and thereupon this object or part thereof can be studied with the spyglass of great amplification. As a rule this spyglass system has, however, the drawback, that the finder and the greatly amplifying spyglass are each equipped with a particular ocular so that a user of such a spyglass, upon passing from the finder to the greatly amplifying spyglass, has to change ocular, which involves as a rule that he has also to change his place of observation. In another known form of construction the spyglass system comprises a single ocular, it is true, but upon the passage from the finder to the spyglass of great amplification this ocular has to be re-adjusted, which also entails drawbacks.

The invention has for its object to avoid these drawbacks. The spyglass system of the above mentioned type according to the invention exhibits the feature that with the aid of the spyglass of great amplification and of a few mirrors of which one or more are removable, a detail of the finder image can be represented in the finder with greater amplification than the finder image, the arrangement being such that with the aid of the same ocular both the image of the spyglass of great amplification and the finder image can be observed.

If it is desired to adjust such a spyglass system with the aid of the finder on an object, the removable mirror or mirrors are pushed or tipped away so that the whole or substantially the whole field of view of the finder is at one's disposal. Then the spyglass system is focussed with the aid of the finder. Subsequently, an indicating device which, in accordance with the invention, may be present in the finder and which may consist, for example, of a reticle is adjusted on that detail of the finder image which it is desired to observe with greater amplification than that which is obtained with the aid of the finder. When this is done, the removable mirror or mirrors are brought into the working position and the detail in question can be directly observed through the ocular of the finder in the amplification pertaining to the spyglass of great amplification. To permit sharp observation of this detail it is necessary that the finder image itself and the detail of the image of the spyglass of great amplification which is represented by this spyglass are located at the same place in the finder.

Although spyglasses have in general to satisfy the requirement that the optic angle in which objects can be observed with the aid of such a spyglass should be comparatively large, which requirement causes that on account of the complicated objective or (telescope) mirror such spyglasses are in general rather expensive, a comparatively small field of view and therefore also simple means are sufficient in the spyglass system according to the invention as regards the spyglass of great amplification which occurs therein. This is possible owing to the fact that in the spyglass system according to the invention the finder, which affords a slight amplification in comparison with the spyglass of great amplification, may have nevertheless, by simple means, a large field of view, owing to which the spyglass system according to the invention may also be of considerably cheaper construction than the customary spyglasses of great amplification. Although it is possible to construct the spyglass of great amplification which is present in the spyglass system according to the invention as a refractor spyglass, it is advisable, in accordance with the invention, to constitute this spyglass by a telescope since the latter can be realised by simpler means than a refractor spy glass.

The mirrors which represent the image of the spyglass of great amplification in the finder may be separate mirrors. It is, however, also imagible to constitute one or more of these mirrors by one or more totally reflecting boundary surfaces of one or more prisms. It is, however, of great importance that the removable mirror system, which may consequently consist of one or more mirrors, should be very small and light. In one form of construction of the spyglass according to the invention the removable mirror with the appurtenant mounting has a weight of only 0.3 g. If the removable mirror system is satisfactorily supported in mechanical respect, which may be realised by simple means, we obtain the advantage that the image of the spyglass of great amplification can be moved into and out of the finder by means of this removable mirror system with an extremely slight exertion. This is of great importance since now there is no risk of this movement bringing about a movement or vibration of the entire spyglass system, which might lead to the adjustment on a determined object being destroyed due to such a movement or vibration. The mirror system may be removed, for example, by exerting an extremely slight pressure on the controlling wire of a Bowden cable system.

With the spyglass system according to the invention the distance of the object is in general so large and, if the spyglass of great amplification is constructed as a telescope, the mirror present therein may be constructed so as to have so small a diameter that means for neutralizing the spherical aberration which occurs with such a mirror if the latter has a spherical shape, are not absolutely necessary. According to the invention, however, it is preferred more particularly if use is made of telescope mirrors of large diameter, to arrange at some distance from the telescope mirror a correction element which neutralizes, either wholly or partly, the spherical aberration of the telescope mirror. If desired, this correction element may be built up from more than one lens.

The spherical aberration can be neutralized practically completely by a correction element whose surface has, at least on one side, the course of a curve higher than one of the second degree. These elements may be made of glass; on account of the complicated shape of these surfaces, it is desirable, however, to constitute them by a transparent material which, or at least the starting material of which, at a low temperature and, as the case may be, in solution, can be deformed, more particularly gelatinized, pressed, press-cast, squirted or die-cast. Over a glass correction element of the same shape a correction element consisting of such materials offers the advantage that without any need of being ground it can be manufactured with great precision in a template. When the template has once been made, for example from metal, on a lathe it is possible to produce with the aid of such a template a practically unlimited number of correction elements.

On the other hand, it is also possible, according to the invention, to form the correction element with spherical boundary surfaces, if desired, combined with plane boundary surfaces. Correction elements of this kind offer the advantage that they are very cheap and may consist of ordinary commercially obtainable spectacle-glasses. It is also possible to obtain the telescope mirror by forming a spherical meniscus lens on one side as a mirror, in which event also a spyglass with satisfactory properties can be obtained by very simple and little expensive means.

The limitation to a small field of view involves the advantage that in this case the above-mentioned correction element may be arranged, without causing excessive divergences, at a distance from the telescope mirror which is approximately equal to the focal distance of this mirror. This arrangement has the advantage that the same correction element functions properly for any distance of the object which may occur in practice.

The arrangement at a distance approximately equal to the focal distance of the telescope mirror affords the advantage that the constructional length of the spyglass becomes comparatively small so that the latter can be easily handled.

According to the invention, it is simple from a constructional point of view to construct the spyglass system, if in the latter a telescope is utilized as the spyglass of great amplification, in such manner that the plane of the finder objective and the plane of the correction element coincide or at least substantially coincide and/or that the plane of the telescope mirror and the plane of the ocular also coincide or at least substantially coincide.

The invention will be explained more fully with reference to the accompanying drawing wherein Fig. 1 represents a diagrammatical longitudinal section of one embodiment of the spyglass system according to the invention, wherein the spyglass of great amplification is constructed as a telescope.

Fig. 2 illustrates diagrammatically the Bowden cable mechanism controlling the displaceable mirror; while Fig. 3 demonstrates the appearance, in the ocular, of the amplified finder image detail deriving from the spyglass as surrounded by the finder image.

In this figure 1 and 2 denote a telescope and a finder respectively which both comprise cylindrical casings 3 and 4 respectively which are rigidly secured relatively to one another with the aid of clamps 5. At 6 and 7 the walls of the telescope casing and of the finder casing have apertures which are in alignment with each other. To the finder casing 4 is secured a joined ball and socket coupling 8 which permits the adjustment of the whole spyglass with respect to a stand (not shown).

The telescope mirror 9 consists of a spectacle glass 9 whose concave surface 10 is silver-plated. The mirror thus obtained has a focal distance of 50 cms. This focal distance is approximately equal to the distance between the mirror 10 and the lens 11 which eliminates or at least substantially eliminates, the spherical aberration of the mirror 10. The lens 11 is a meniscus lens of a power of $-0.25$ dioptric. The lens 11 has spherical surfaces.

In the finder is arranged an objective 13, likewise a biconvex lens with spherical surfaces, which has its focus at $F_{13}$. In the finder are arranged furthermore an amplifying inverting lens 14 and an ocular which consists of two lenses 15 and 16. Furthermore, in the telescope is arranged a plane mirror 17, in the apertures 6 and 7 of the telescope casing and the finder casing respectively a plane mirror 18 and in the finder a plane mirror 19. These mirrors are arranged with respect to one another in such manner that at $F_{13}$ an image is formed of an object present at a large distance from the telescope. All this follows from the path of the represented light rays $a$ and $b$.

The mirror 19 is arranged on the end of a Bowden cable mechanism 20 (Fig. 2) so that upon depressing a button 21 provided thereon this mirror 19 occupies the position shown in Figs. 1 and 2 (working position). When the button 21 is released, the mirror 19 returns, under the action of a spring (not shown), to its position of rest (indicated in dotted lines in Fig. 2) outside the rays of light $c$ and $d$ which form the finder image. The Bowden cable mechanism is fixed in the casing 4 of the finder with the aid of a bush 22. The mirror with the appurtenant mounting has a weight of only 0.3 g. If the mirror 19 is out of reach of the light rays $c$ and $d$ it is possible to focus an object in the syyglass by means of the finder with the aid of the objective 13 present therein, the inverting lens 14 and the ocular 15—16. When the object has once been focussed, for which purpose the holder 24 of the ocular lenses may be caused to slide to and fro in the finder casing, the reticle system 23 is aimed at that part of the object which it is desired to observe with greater amplification. Subsequently, by pressing the button 21 of the Bowden cable mechanism the mirror 19 is placed in the working position indicated in Fig. 1. It is now possible to observe the desired detail directly through the ocular in the amplification of the telescope.

According to the size of the mirror 19 the telescope image in the finder overlaps the finder image proper either wholly or partly. Thus, Fig. 3 shows an example wherein the field of the finder and that of the telescope in the finder are denoted by 25 and 26 respectively, the reticle system being denoted by 23. It may be seen from the figure that out of the finder image, which consists here of a church and a house, a portion, viz. the church-clock, is represented greatly amplified in the telescope and partly overlaps the finder image. In the form of construction according to Fig. 1, on the contrary, the telescope image is larger than the finder image, which ensues from the fact that the mirror 19 intercepts the outermost light rays c and d which come from the left from the finder objective so that to the right of the mirror 19 these rays of light are therefore represented in this figure in dotted lines.

Owing to the use of the mirrors 17, 18 and 19 it is possible to obtain a spyglass whose dimensions remain within reasonable limits. Furthermore, the use of the mirror 19 with a comparatively large focal distance renders it possible to utilize a correction element of simple shape. The lens 14 ensures a further amplification of the telescope image.

Even if the spyglass of great amplification is a refractor spyglass, the spyglass system may, of course, also be constructed, if desired, as a double spyglass.

What I claim is:

1. A spyglass system comprising a greatly magnifying telescope and a finder, each including a casing and an optical system arranged therein, said casings being secured together with their axes parallel and provided with apertures in alignment with each other, said telescope including a spherical mirror and a correction element therefor spaced from said mirror, a mirror system including a fixed mirror arranged in the telescope in spaced relationship to the wall of the casing and near the aperture therein, a fixed mirror at said aperture, and a movable mirror adapted to be moved into and out of the optical axis of the finder and to be so positioned therein as to cover only part of the field of view and to cooperate with the fixed mirrors of the mirror system in focusing the image from the telescope into the focal field of the finder to be viewed by the single ocular of the finder, whereby the finder image and the telescope image may be viewed simultaneously and separately.

2. A spyglass system comprising a greatly magnifying telescope and a finder, each including a casing and an optical system arranged therein, said casings being secured together with their axes parallel and provided with apertures in alignment with each other, the optical system in said telescope including a spherical mirror and a correction element therefor spaced from said mirror, a mirror system including a fixed mirror centrally arranged in the telescope in spaced relationship to the wall of the telescope casing and near the aperture therein, a fixed mirror near said apertures, and a movable mirror adapted to be moved into the optical axis of the finder and to be so positioned in spaced relationship to the wall of the finder casing and near the aperture therein as to cover only part of the field of view and to cooperate with the fixed mirrors of the mirror system, in focusing the image from the telescope into the center of the focal field of the finder to be viewed by the single ocular, whereby the finder image may be viewed separately from or simultaneously with the telescope image, one of said images appearing in the center and totally surrounded by the marginal remainder of the other image.

3. A spyglass system comprising a greatly magnifying telescope and a finder, each including a casing and an optical system arranged therein, said casings being secured together with their axes parallel and provided with apertures in alignment with each other, the optical system in said telescope including a spherical mirror and a correction element therefor spaced from said mirror, a distance approximately equal to the focal distance of said mirror, a mirror system including a fixed mirror centrally arranged in the telescope in spaced relationship to the wall of the telescope casing and near the aperture therein, a fixed mirror near said apertures, and a movable mirror adapted to be moved into the optical axis of the finder and to be so positioned in spaced relationship to the wall of the finder casing and near the aperture therein as to cover only part of the field of view and to cooperate with the fixed mirrors of the mirror system, in focusing the image from the telescope into the center of the focal field of the finder to be viewed by the single ocular, whereby the finder image may be viewed separately from or simultaneously with the telescope image, one of said images appearing in the center and totally surrounded by the marginal remainder of the other image.

4. A spyglass system comprising a greatly magnifying telescope and a finder, each including a casing and an optical system arranged therein, said casings being secured together with their axes parallel and provided with apertures in alignment with each other, the optical system in said telescope including a spherical mirror and a correction element therefor spaced from said mirror, said finder including an objective, the planes of said objective and said correction element coinciding at least substantially, a mirror system including a fixed mirror centrally arranged in the telescope in spaced relationship to the wall of the telescope casing and near the aperture therein, a fixed mirror near said apertures, and a movable mirror adapted to be moved into the optical axis of the finder and to be so positioned in spaced relationship to the wall of the finder casing and near the aperture therein as to cover only part of the field of view and to cooperate with the fixed mirrors of the mirror system, in focusing the image from the telescope into the center of the focal field of the finder to be viewed by the single ocular, whereby the finder image may be viewed separately from or simultaneously with the telescope image, one of said images appearing in the center and totally surrounded by the marginal remainder of the other image.

5. A spyglass system comprising a greatly magnifying telescope and a finder, each including a casing and an optical system arranged therein, said casings being secured together with their axes parallel and provided with apertures in alignment with each other, the optical system in said telescope including a spherical mirror and a correction element therefor spaced from said mirror, said finder including an ocular, the planes of said ocular and said spherical mirror coinciding at least substantially, a mirror system including a fixed mirror centrally arranged in the telescope in spaced relationship to the wall of the telescope casing and near the aperture therein, a fixed mirror near said apertures, and a movable mirror adapted to be moved into the optical axis of the finder and to be so positioned in spaced relationship to the wall of the finder casing and near the aperture therein as to cover only part of the field of view and to cooperate with the fixed mirrors of the mirror system, in focusing the image from the telescope into the center of the focal field of the finder to be viewed by the single ocular, whereby the finder image may be viewed separately from or simultaneously with the telescope image, one of said images appearing in the center and totally surrounded by the marginal remainder of the other image.

6. A spyglass system comprising a greatly magnifying telescope and a finder, each including a casing and an optical system arranged therein, said casings being secured together with their axes parallel and provided with apertures in alignment with each other, the optical system in said telescope including a spherical mirror and a correction element therefor spaced from said mirror, a mirror system including a fixed mirror centrally arranged in the telescope in spaced relationship to the wall of the telescope casing and near the aperture therein, a fixed mirror near said apertures, and a movable mirror weighing at most 2 g. and a Bowden cable mechanism for moving said movable mirror into the optical axis of the finder to be so positioned in spaced relationship to the wall of the finder casing and near the aperture therein as to cover only part of the field of view and to cooperate with the fixed mirrors of the mirror system, in focusing the image from the telescope into the center of the focal field of the finder to be viewed by the single ocular, whereby the finder image may be viewed separately from or simultaneously with the telescope image, one of said images appearing in the center and totally surrounded by the marginal remainder of the other image.

ALBERT BOUWERS.